L. W. LA BAUVE.
DETACHABLE AUTOMOBILE SPRING TIRE.
APPLICATION FILED APR. 11, 1918.

1,298,062.

Patented Mar. 25, 1919.
2 SHEETS—SHEET 1.

INVENTOR
L. W. La Bauve,
BY
ATTORNEY

L. W. LA BAUVE.
DETACHABLE AUTOMOBILE SPRING TIRE.
APPLICATION FILED APR. 11, 1918.
1,298,062.
Patented Mar. 25, 1919.
2 SHEETS—SHEET 2.
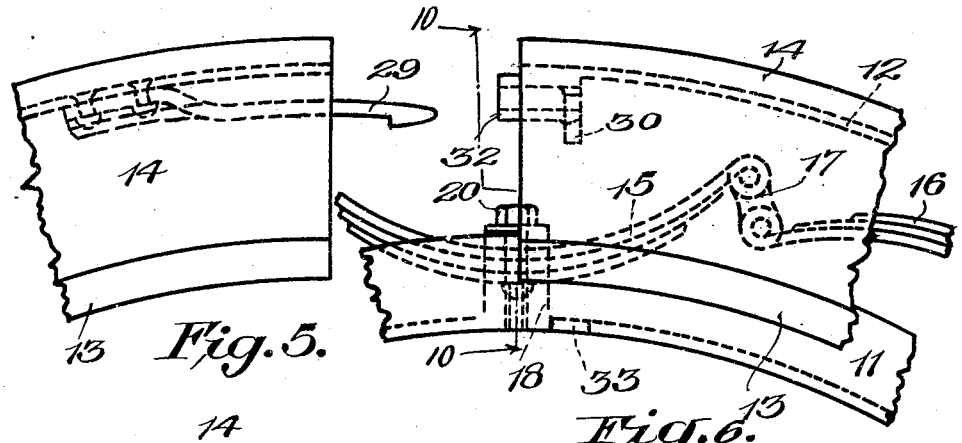
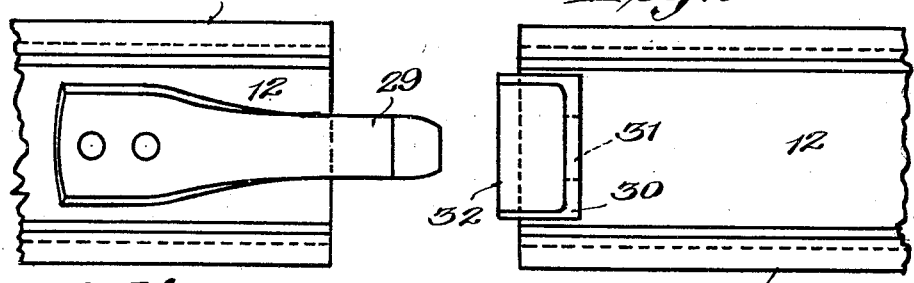
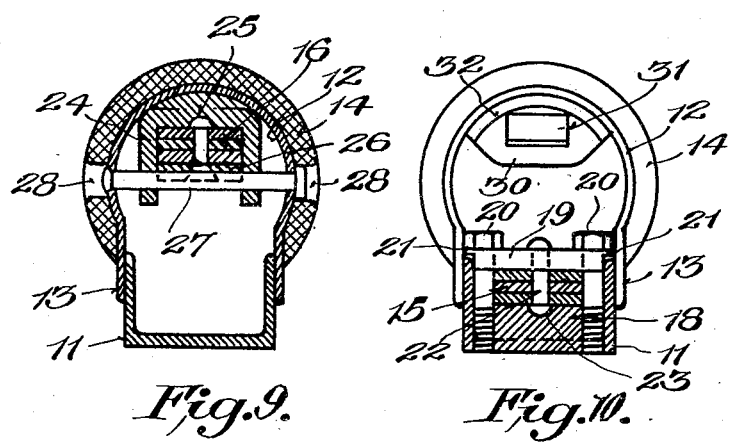
INVENTOR
L. W. La Bauve,
BY
ATTORNEY

UNITED STATES PATENT OFFICE.

LILLIE W. LA BAUVE, OF HOUSTON, TEXAS.

DETACHABLE AUTOMOBILE SPRING-TIRE.

1,298,062.   Specification of Letters Patent.   Patented Mar. 25, 1919.

Application filed April 11, 1918. Serial No. 227,902.

*To all whom it may concern:*

Be it known that I, LILLIE W. LA BAUVE, a citizen of the United States, residing at Houston, in the county of Harris and State of Texas, have invented certain new and useful Improvements in Detachable Automobile Spring-Tires, of which the following is a specification.

This invention relates to certain new and useful improvements in a detachable automobile spring tire and particularly to a detachable automobile tire embodying leaf springs, an object being to design and construct the tire so as to fit, without alteration, wheels made for pneumatic tires.

Among further objects, the invention seeks to provide a simple construction and arrangement of leaf springs in which the alternate springs have a secure connection with the inner and outer tire parts, respectively, such connections facilitating the assembling of the parts.

The invention further resides in the features of construction and the arrangements and combinations of parts hereinafter described and claimed, reference being had to the accompanying drawings wherein—

Fig. 5 is an enlarged fragmentary side elevation of one end of one of the outer casing sections.

Fig. 6 is an enlarged fragmentary side elevation of the end of the complementary outer casing section, the inner casing being shown in fragment;

Fig. 7 is a bottom plan view of Fig. 5;

Fig. 8 is a bottom plan view of Fig. 6 but with the inner casing and the springs in Fig. 6 omitted;

Fig. 9 is a section on the line 9—9 of Fig. 1; and

Fig. 10 is a section on the line 10—10 of Fig. 6.

Figures 1, 2:
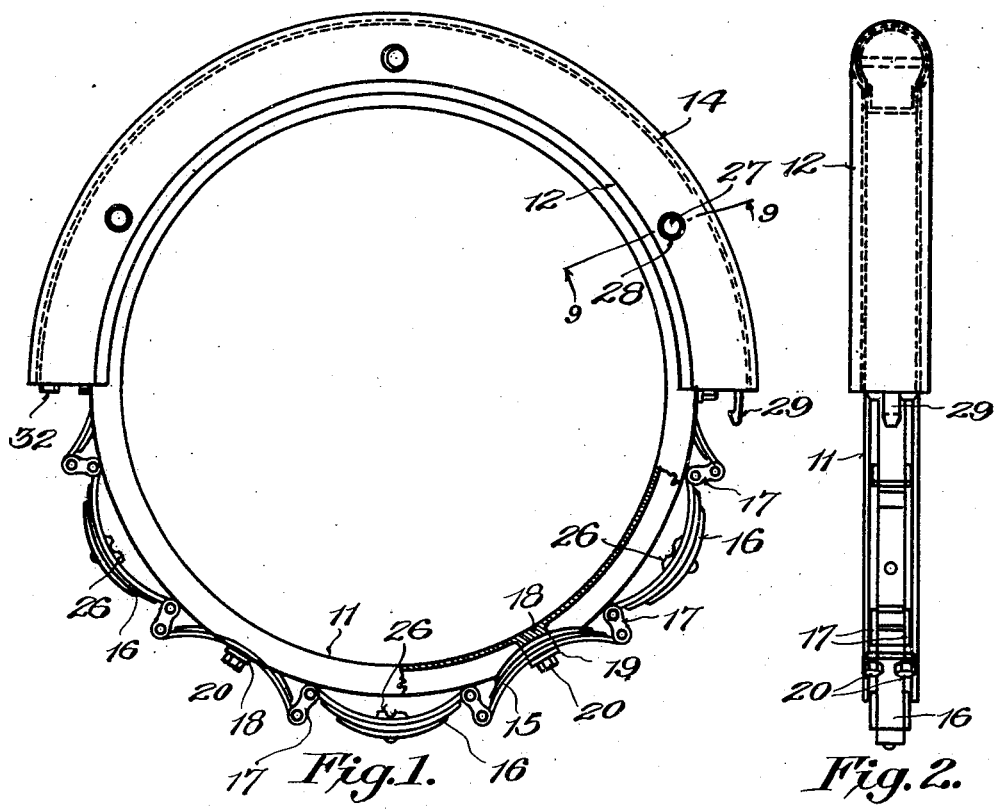
Figure 1 is a side view with the lower section of the outer casing removed the inner casing being partly broken away and partly in section.
Fig. 2 is a front elevation of Fig. 1.
Figures 3, 4:
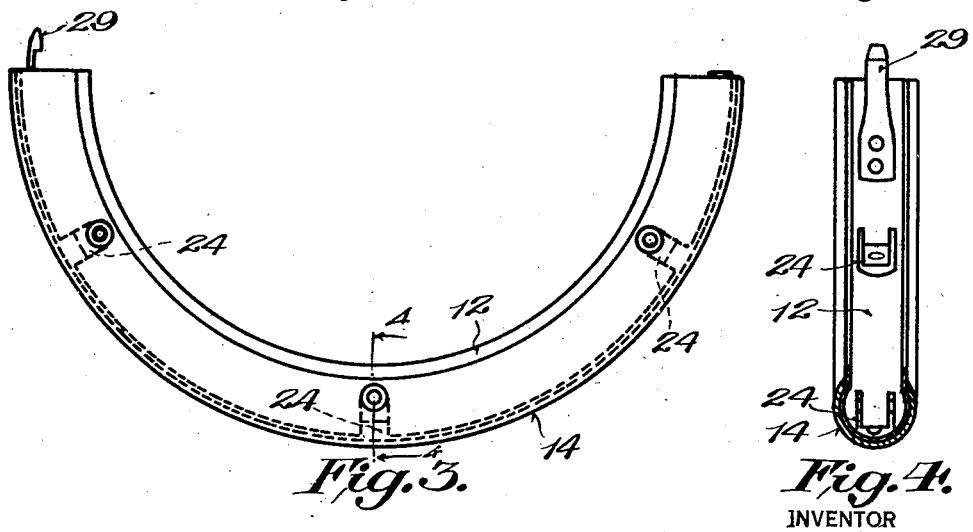
Fig. 3 is a side elevation of the lower section of the outer casing.
Fig. 4 is a transverse vertical section taken on the line 4—4 of Fig. 3.

Referring more in detail to the drawings, the numeral 11 designates the inner casing or rim which is preferably a steel ring of channeled section and its outer side faces straight and substantially parallel. The outer casing 12 is also preferably constructed of steel and is round in section with the exception that its free edge portions are extended inwardly in parallelism to provide rim-embracing flanges 13. An elastic cover 14, such as rubber, is applied to and secured on the outer casing.

The outer casing is yieldably and resiliently supported from the rim member by two sets of bowed leaf springs, the leaf springs 15 being bowed inwardly and secured centrally to the rim while the leaf springs 16 are bowed outwardly and are secured centrally to the outer casing. The springs of the two sets are alternately arranged so that one leaf spring is bowed oppositely to the next adjacent leaf springs. The ends of each spring are pivotally and swingingly connected to the opposing ends of the two adjacent springs by double, short links 17 so that the ends of each leaf spring are supported in suspension from the adjacent ends of the leaf springs on the opposite sides thereof.

The springs 15 have their central convex portions seating on the lugs 18 which are arranged in a peripheral series between the side walls of the channeled rim, each spring 15 being secured to its seat by a transverse cleat 19 and a pair of cap screws 20, the latter passing through the end portions of the cleat and having threaded engagement with the lugs and rim, as depicted in Fig. 10. The ends of the cleats fit snugly between the sides of the channel rim and have extensions 21 that engage over the inner edges of said sides. A rivet 22 secures the cleat centrally to the spring 15, passing through the several leaves of the latter and headed to engage in a recess 23, formed in the outer face of the lug 18, and thereby serve as a means for holding the spring against longitudinal slipping.

The mounting for the springs 16 includes a peripheral series of U-shaped or channeled brackets or supports 24 that have their outer faces convexed to conform to the inner surface of the outer casing to which they are firmly secured. The leaves of each spring 16 are also riveted together, and the outer head of the rivet is seated in a recess 25, formed in the base of the U-shaped support 24, to withstand longitudinal stress. The inner end of the rivet is embedded in the transverse bearing plate 26 and both are channeled crosswise to receive a transverse pin 27, the end portions of which are extended through the sides of the U-support and the sides of the outer casing, as depicted in Fig. 9. The ends of the pin may then be riveted, being accessible through suitable registering openings 28 left in the rubber covering 14.

The outer casing is preferably constructed in two semi-circular sections that are detachably but firmly connected together to form a complete and circular casing by means of a pair of hooks 29 and coöperating slotted keepers 30. Each hook is riveted to one end of each casing section at a point spaced inwardly from the abutting ends of said sections, with the shank portion of the hook spaced from the inner walls of the casing for ready yielding movement. The coöperating keeper 30 is carried by the abutting end of the companion casing section and is provided with an oblong slot 31 through which the hook passes.

Extending beyond the end of the section the keeper is formed with a dowel part 32 designed to enter the opposing end of the companion section and thus aline the sections when being moved together as well as serve to hold the sections in the same plane and reinforce the joint.

To unlock the section, a hole 33 is formed in the rim member opposite each keeper of the outer casing to permit a tool being inserted therethrough for pushing the hook outwardly from engagement with the keeper.

The tire comprising its inner casings and the included springs, is so designed and constructed that it will fit the modern wheels made for pneumatic tire equipment, no alteration being necessary to substitute the present invention for the pneumatic tire. The tire is puncture proof, resilient and wear-resisting, and the construction is simple and durable.

What is claimed is:

1. A detachable spring tire comprising a rim, an encircling casing formed in sections and having inwardly extending flange portions slidably embracing the sides of the rim, spring means yieldably supporting the casing from the rim, and means connecting the ends of the casing sections together including a hook secured within one section extending circumferentially and concentrically therewith beyond the end thereof, and a keeper carried by the adjacent end of the next casing section and extending beyond said section and being formed to receive and guide the free end of the hook for holding the sections alined, and a wall at the inner end of the keeper formed with an opening to receive the free end of the hook, said keeper extending down on opposite sides of the hook to guide it to the opening in the wall, and said spring means extending across the meeting ends of the casing sections.

2. A tire for automobiles comprising a rim, springs on the rim, an outer casing therefor having a tread covering, a series of U-supports extending inwardly within the casing and having perforated sides, leaf springs seating on the U-supports between the sides thereof, a transverse plate riveted to the casing springs with the outer heads of the rivets engaged in a recess formed in the respective supports, the transverse plates and embedded rivet heads being channeled crosswise in alinement with the perforations in the sides of the U-supports, securing pins engaged in the channels of the plates and rivets and passed through the perforations of the U-supports and the sides of the outer casing, and links connecting the ends of the casing springs to the ends of the rim springs.

3. A tire for automobiles comprising a channeled rim, leaf springs secured on the rim, an outer casing, a series of U-supports extending inwardly within the casing in spaced relation to the sides of said casing, leaf springs arranged on the supports between their sides, means securing the second springs to the U-supports and reinforcing the sides of the latter from the casing.

4. A tire for automobiles comprising a rim, an outer hollow casing formed in sections, a hook secured at one end within an end of one casing section, said hook being offset adjacent its point of mounting and extending in spaced relation to the inner wall of said section beyond the end thereof, the free end of the hook being formed into a catch part, and a keeper carried within the adjacent end of the adjacent casing section, said keeper consisting of a hood-like dowel part projecting beyond its supporting casing section for alining the sections and for guiding the hook to its keeper, and a radially extending end wall at the inner end of the dowel part formed with an opening to receive the hook, said keeper and hook being spaced outwardly beyond the rim and coöperating therewith to hold the casing sections alined against lateral movement.

In testimony whereof I affix my signature.

LILLIE W. LA BAUVE.